Patented Feb. 19, 1935

1,991,398

UNITED STATES PATENT OFFICE 1,991,398

COMPOSITIONS FOR PLASTIC MOLDING

Max Landecker, Wuppertal-Barmen, Germany, assignor, by mesne assignments, to American Cyanamid Company, a corporation of Maine No Drawing. Application June 28, 1930, Serial No. 464,698. In Germany July 2, 1929

7 Claims. (Cl. 106—22)

This invention relates to the production and preparation of improved compositions for plastic-molding, particularly compositions in the form of solid pieces or granulated or powdered which under heat and pressure flow to the shape of the mold.

According to the invention there is employed, either as the main binder (for binding a filler) or as a plasticizer or flow-promoter of another binder, pentamethylenediamine disulphine or kindred compounds containing sulphur and derived from aldehydes or ketones. Pentamethylenediaminedisulphine is a resinous body obtained by the action of ammonium sulphide on formaldehyde:—

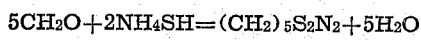

$$5CH_2O + 2NH_4SH = (CH_2)_5S_2N_2 + 5H_2O$$

(see Annales de Chimie et de Physik, 7, series 15,3 (1898) pages 570 and 571). This body softens at about 60° C., possesses a high degree of resistance towards alkalies and acids and is soluble in various organic solvents e. g. chloroform.

Employing this body, pentamethylenediaminedisulphine, as a binder, a wide range of filling materials my be incorporated therewith, to produce a good plastic molding composition. In particular may be mentioned albumenous substances and insoluble condensation products of the type of phenol-aldehydes or urea-aldehydes as well as wood pulp, starch, asbestos, lithopone, etc.

The incorporation of the filler is preferably effected between heated rollers, the melting sulphine binder being capable of absorbing and penetrating up to 60% of filler. Pulverization can be effected without difficulty and the fine powder flows very satisfactorily under heat and pressure.

Additions of acid or alkaline reacting substances may be made according to the hardness properties required in the molded article and it will be understood that coloring matters and other additions of various kinds may be made such as are customary in plastic molding.

According to another feature of the invention, the sulphine body is used in combination with added sulphur. It is found that large proportions of sulphur are readily absorbed and that a chemical conversion occurs which renders the body harder and produces a change of color. For instance, when incorporated with three or four times its weight of sulphur, the sulphine body undergoes conversion into a hard reddish-colored body of relatively high melting point. The sulphur enriched sulphine body is capable of being worked up with filling substances of all kinds into plastic masses in the manner hereinbefore described. In this connection it is not necessary first to combine the pentamethylenediaminedisulphine with the sulphur, but it is sufficient to work this substance up together with the filling substance and sulphur, for example, on rollers.

As already stated, the sulphine body may be used according to the invention as a plasticizer or flow promoter for plastic molding composition. It may be incorporated in such capacity in various kinds of molding compositons requiring the joint or separate use of heat and pressure for molding, particularly such as have a basis of albumenous substances or shellac or formaldehyde condensation products of all kinds. Apart from its beneficial action in the mold, the addition brings about in many cases an increase in the water resistance properties of the molded article.

The sulphur-enriched sulphine body may likewise be added with advantage to plastic molding compositions. Furthermore the sulphine body itself or in its sulphur-enriched form may be added to rubber in which case it functions not only as a plasticizer but also to reduce ageing and at the same time to effect considerable acceleration in vulcanization. The elasticity of the vulcanized product is also improved.

The addition of the plasticizers may be in various proportions and it is obviously impossible to lay down a definite rule as to the optimum proportion for plastic compositions in general but in practically every case the most favorable proportion is between 1 and 10%.

The plasticizers may be added in pulverized or dissolved state or in any other suitable state. They may also be deposited in nascent state on or in the fillers and plastic masses by moistening them with formaldehyde and then with ammonium sulphide or the like (or vice versa) and allowing them to react. These examples however merely serve to indicate the possibilities and are by no means exhaustive.

According to a further feature of the invention there may be used as plasticizers, instead of pentamethylenediaminedisulphine and its kindred compounds, condensation products obtained by condensing these compounds with urea.

It is to be understood that the term "pentamethylenediaminedisulphine", used in the appended claims, includes kindred compounds containing sulphur and derived from aldehydes or ketones.

I claim:—

1. A composition for molding under heat and pressure comprising a substantially dry and pulverulent mixture of pentamethylenediaminedisulphine and a filler material.

2. A composition for molding under heat and pressure comprising a substantially dry and pulverulent mixture of pentamethylenediaminedisulphine, sulphur and a filler material.

3. A composition for molding under heat and pressure comprising a substantially dry and pulverulent mixture of pentamethylenediaminedisulphine chemically combined with sulphur, and a filler material.

4. A composition for molding under heat and pressure comprising a substantially dry and pulverulent mixture of pentamethylenediaminedisulphine condensed with urea, and a filler material.

5. A composition for molding under heat and pressure comprising a substantially dry and pulverulent mixture of pentamethylenediaminedisulphine, a thermoplastic resin, and a filler material.

6. The composition of claim 5 in which the disulphine forms 1 to 10% of the mixture.

7. The composition of claim 2 in which the sulphur is present in an amount equivalent to 3 to 4 times the weight of the disulphine.

MAX LANDECKER.